United States Patent [19]

Bazan et al.

[11] Patent Number: 4,646,783
[45] Date of Patent: Mar. 3, 1987

[54] ANTI-STALL BALL-CHECK VALVE

[76] Inventors: Alberto Bazan, 4928 Scott's Creek Trail, Duluth, Ga. 30136; Donald M. Murphy, 739 Oak View Ct., Lilburn, Ga. 30093

[21] Appl. No.: 763,990

[22] Filed: Aug. 9, 1985

[51] Int. Cl.$^4$ .................. F16K 15/04; F16K 51/00
[52] U.S. Cl. .................. 137/533.11; 251/284; 137/515
[58] Field of Search .............. 137/533.11, 515, 15; 251/284

[56] References Cited

U.S. PATENT DOCUMENTS

| 2,018,769 | 10/1935 | Tryon | 137/533.11 |
| 2,695,628 | 11/1954 | Wheildon, Jr. | 137/533.11 |
| 3,113,587 | 12/1963 | Hendley | 251/284 |
| 3,561,472 | 2/1971 | Lamb et al. | 137/533.11 |
| 3,620,228 | 11/1971 | Schmid | 137/533.11 |
| 3,787,149 | 1/1974 | Dane et al. | 137/533.11 |
| 3,955,648 | 5/1976 | Walker, Jr. et al. | 137/533.11 |
| 3,990,472 | 11/1976 | Etes | 137/533.11 |

FOREIGN PATENT DOCUMENTS 0090768  7/1980  Japan .......................... 137/533.11

Primary Examiner—Alan Cohan
Assistant Examiner—John A. Rivell
Attorney, Agent, or Firm—L. Lawton Rogers, III; Joseph M. Killeen

[57] ABSTRACT

A novel vertical ball-check valve for a sanitary diaphragm pump with a unitary housing and valve seat, an elastomeric ball, preferably hollow to respond to low pump pressure, and a removable ball stop to permit removal of the ball for inspection and cleaning of the valve housing. The ball, passageway, and ball stop are sized relative to each other to provide space for solids which have passed through the valve seat to be discharged from the outlet end without stalling the valve. A method for total visual inspection of the ball-check valve without removing the check from the system is also disclosed.

7 Claims, 3 Drawing Figures

ANTI-STALL BALL-CHECK VALVE

BACKGROUND OF THE INVENTION

The present invention relates generally to a ball-check valve for a pump, and more particularly to a valve for use in the vertical piping of a sanitary diaphragm pump.

Diaphragm pumps are well known and are often used in the food industry where the sanitary condition of the pump and its valves are a prime consideration. A ball-check valve used in a sanitary pump requires inspection at frequent intervals of the valve seat, the ball, and other internal surfaces to check for entrapped food particles that can cause buildup of bacteria. The porosity of stainless steel and the surface roughness of welds are problems in such an application.

Known ball-check valves such as disclosed in the Hallstrom Jr. U.S. Pat. No. 2,934,024 dated Apr. 26, 1980, include a removable ball and valve seat, but is not readily inspected. Other valves, such as the Wilden Model M-8 "Foodmaster" pump, include a removable elastomer valve seat, an elastomer ball, and a ball valve cage. These features facilitate inspection and cleaning of the valve, but the valve seat, because of constant friction in use, requires frequent replacement. Moreover, the valve cage is larger in size, expensive to manufacture, reduces the size of particles which can pass through the valve, and increases the time necessary for inspection and cleaning.

Other known valves such as the Depa DL-40SL replace the removable valve seat with an integral seat and replace the valve cage with a solid bar ball stop welded into the valve housing from the outside, since welding is unacceptable for sanitary application on the inside because of the extreme difficulty to weld, grind and polish. However, this lack of unitary structure on the inside results in bacterial buildup. In addition, this design does not permit a visual inspection of the inside passages of the valve.

It is accordingly an object of the present invention to obviate the above described deficiencies and to provide a novel ball-check valve for use in a sanitary pump or other application.

It is another object of the present invention to provide a novel ball-check valve which is less expensive to produce, self-cleaning in design, and easily inspected.

It is still another object of the present invention to provide a novel ball-check valve structure with an integral housing and valve seat and easily removable ball stop.

It is yet another object of the present invention to provide a novel ball-check valve in which all internal surfaces may be visually inspected when looking inward from the outlet end of the valve.

It is a further object of the present invention to provide an anti-stall ball-check valve for a low pressure pump.

Yet a further object of the present invention is to provide a novel ball-check valve in which elastomer-to-elastomer contact is avoided.

Yet another object of the present invention is to provide a novel ball-check valve which does not require welding.

Yet a further object of the present invention is to provide a novel ball-check valve which has a valve seat unitary with the valve housing so that the difficulty in valve seat removal and bacterial build-up can be avoided.

These and many other objects and advantages will be readily apparent to one skilled in the art to which the invention pertains from a perusal of the claims and the following detailed description of the preferred embodiments when read in conjunction with the appended drawings.

THE DRAWINGS

DETAILED DESCRIPTION OF PREFERRED EMBODIMENTS

Figure 1:
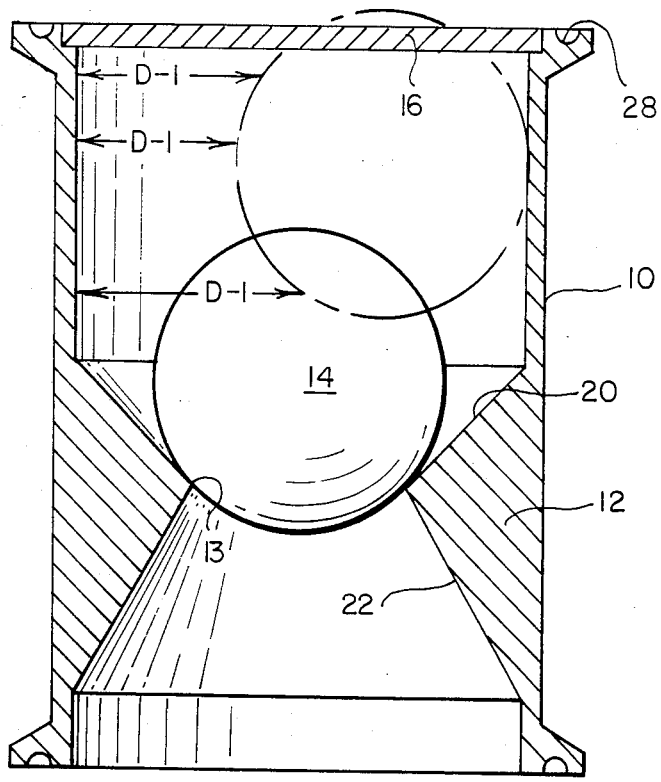
FIG. 1 is an elevation of the valve of the present invention in cross-section showing a unitary valve housing with an integral valve seat, a ball resting on the seat with an alternative position shown in dashed lines, and a ball stop resting on an annular groove in the housing at the outlet end.

With reference to the figures where like elements have been given like numbers to facilitate an understanding of the present invention, and particularly with reference to the embodiment of the present invention illustrated in FIG. 1, a unitary valve housing 10 defines a generally cylindrical passageway with a constriction 12 intermediate the ends of the housing to form a valve seat 13. A ball 14 is seated on the valve seat and a removable ball stop 16, described in more detail below in connection with FIG. 3, rests within an annular groove 18 in the housing at the outlet end.

The constriction 12 is generally V-shaped, with the surface 20 on the outlet side forming an angle between about 30 degrees and about 45 degrees, preferably about 45 degrees, to the passageway. The slope 22 of the surface on the inlet side forms an angle of about 68 degrees to the passageway.

The passageway and constriction 12 of the housing 10 are configured to permit inspection of all internal surfaces of the housing 10, both above and below the valve seat, when looking inward from the outlet end of the valve, i.e., the entire surface 22 is visible from the outlet end of the valve housing.

The valve housing 10 may be machined and finished using stainless alloy bar stock or tubing and the valve seat may be machined and finished as an integral part of the housing 10. The resulting unitary construction eliminates the need for a removable valve seat and the added expense and maintenance involved with a removable valve seat.

Figures 2, 3:
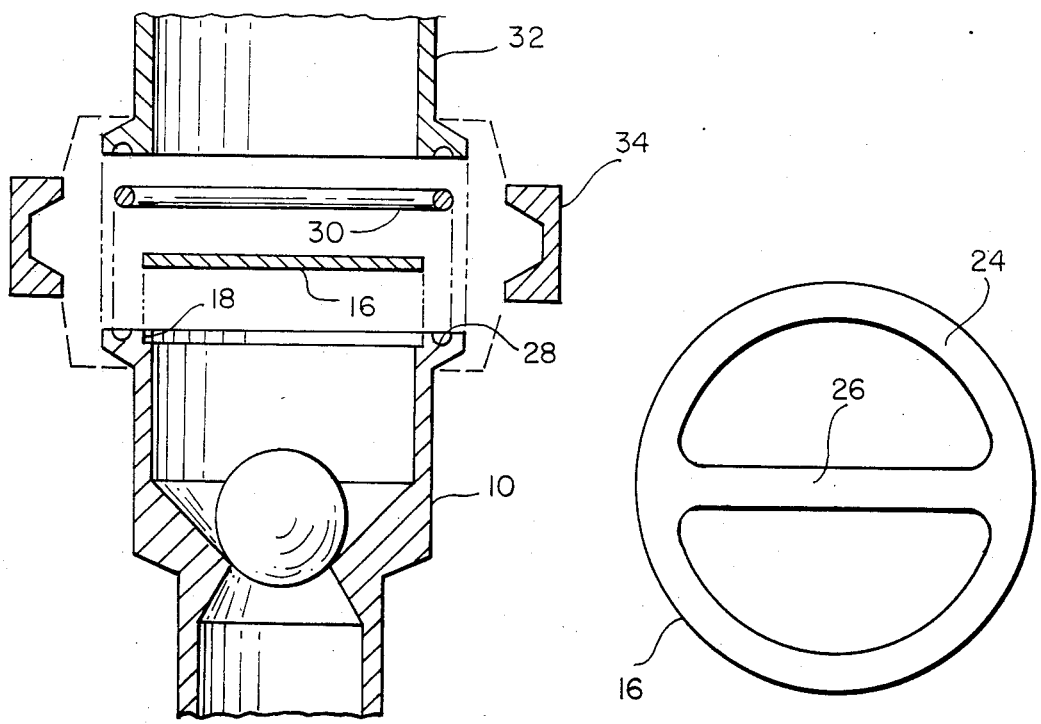
FIG. 2 is an elevation of an alternative embodiment of the valve of the present invention in cross-section illustrating a smaller inlet end to accommodate variations in the size of pump piping and the method of assembly.
FIG. 3 is a top plan view of the ball stop of FIGS. 1 and 2.

FIG. 2 discloses an alternative configuration of the housing 10 which has an inlet end that is smaller than the outlet end.

As shown in FIG. 2, the ball stop 16 may be removably positioned into the annular groove 18 in the outlet end of the housing 10, and may thus be easily removed to permit removal of the ball 14 and inspection and cleaning of the valve passageway. The ball stop 16 eliminates the need for a welded stop and associated problems of keeping such stop free of contamination.

As shown in FIG. 3, the ball stop 16 may have a circular ring 24 sized to rest in the groove 18 with a single bar 26 bisecting the ring 24 to retain the ball 14 within the housing 10. As shown in FIG. 1, a portion of the ball may pass between the bar 26 and the ring 24.

As shown in FIG. 1, the slope of the surface 20, the cross-sectional area of the passageway on the outlet side of the valve seat 13, the diameter of the ball 14, and the distance between the ball stop 16 and the valve seat 13 are such that the distance D-1 between the ball 14 and the housing 10 along the passageway between the ball stop 16 and the valve seat when the ball 14 is stopped by the ball stop 16 is not less than the minimum diameter of the passageway as defined by the constriction 12. The relative configurations of the passageway between the valve seat and the outlet end, the ball 14, and the removable ball stop 16 provide a means for channeling solids from the constriction 12 to the outlet end for discharge without stalling the valve, i.e., the jamming of the ball in the open position by a solid.

The ball 14 may be hollow and constructed of an elastomeric material to make it sufficiently light in weight to be effective for use in a low pressure typical in food pumps.

As shown in FIGS. 1 and 2, both the inlet and outlet ends preferably have an annular groove 28 for an O-ring 30 to be inserted when clamping the valve housing 10 to the vertical piping 32 of the pump by any suitable conventional means such as clamps 34. As shown in FIG. 2, the valve may be readily inspected by unclamping the outlet end of the valve from the piping 32, laterally displacing the piping 32 to provide access to the outlet end of the valve, removing the ball stop 16 and the ball 14, and visually inspecting all surfaces thereof for traces of entrapped solids. Unclamping the inlet end of the housing 10 is not critical to this method of inspection and can be performed on a valve, such as the one illustrated in FIG. 2, that is integral with the pipe or hose at the inlet end.

While the preferred embodiments of the present invention have been described, variations and modifications will naturally occur to those skilled in the art from a perusal hereof. It is therefore, to be understood that the embodiments described are illustrative only and that the scope of the invention is to be defined solely by the appended claims when accorded a full range of equivalence.

What is claimed is:

1. An anti-stall ball-check valve for a low pressure, sanitary diaphragm pump comprising:
a unitary valve housing defining a generally cylindrical passageway with an internal constriction intermediate the ends of said passageway forming a circular valve seat facing the outlet end thereof,
said constriction being generally V-shaped in horizontal cross-section, becoming narrower towards the center of said passageway, with the slope of the constriction on both the outlet side and the inlet side thereof such that the entirety thereof may be viewed from the outlet end of the passageway,
a hollow elastomeric ball dimensioned to close the valve when seated on the valve seat of said constriction, and
a removable ball stop carried by said housing at the outlet end of said passageway, said ball stop having an outer ring conforming generally to the shape of said housing at the outlet end of the passageway and having a single bar bisecting said ring, the slope of said constriction on the outlet side of said valve seat, the cross-sectional area of said passageway on the outlet side of said valve seat, the diameter of said ball, and the distance between said ball stop and said valve seat being such that the distance between said ball and said housing along the length of said passageway between said ball stop and said valve seat when said ball is stopped by said ball stop is not less than the minimum diameter of said passageway as defined by said constriction.

2. The ball-check valve of claim 1 wherein the slope of said constriction on the outlet side thereof forms an angle of between about 45 degrees and about 30 degrees with the passageway, and wherein the slope of the constriction on the inlet side forms an angle of about 68 degrees with the passageway such that the entirety thereof may be viewed from the outlet end of the passageway,
wherein the outlet end of said passageway includes an annular groove; and
including means for removably clamping said inlet and outlet ends to a piping section of the pump so that the valve may be readily installed and removed for inspection and cleaning,
the outer ring of said ball stop being sized to rest in said annular groove at the outlet end of the passageway.

3. A sanitary pump ball-check valve comprising:
a one-piece first housing defining a generally cylindrical passageway having a circular valve seat intermediate the ends thereof,
a ball operatively associated with the valve seat of said first housing interiorly thereof on the downstream side thereof;
a second housing defining a generally cylindrical passageway and being juxtapositioned in an abutting relationship to said first housing on the downstream side thereof with the passageway generally coaxial and in fluid communication with the passageway of said first housing; and
ball stop means at the juxtaposition of said two housings for stopping the passage of said ball therethrough,
the separation of said second housing from said first housing permitting the removal of said ball stop means and said ball and the visual inspection of the entire internal surface of said first housing from the downstream end thereof.

4. In the vertical piping of a sanitary pump for a mixture of liquids and solids, an improved anti-stall ball-check valve comprising:
one-piece means for channeling a mixture of liquids and solids through the valve including means for constricting said channeling means;
a ball disposed within said channeling means, said ball being sized to seat on the outflow side of said constricting means and thereby prevent reverse flow of the mixture through said constricting means; and
means carried at least in part by said channeling means for removably retaining said ball within said channeling means,
said channeling means and said retaining means being sized relative to said ball to allow solids that have passed through said constricting means clearance sufficient to continue passage through and be discharged from the valve, thereby preventing stalling of the valve by a solid in the mixture.

5. The valve of claim 4 wherein said constricting means is configured to allow unobstructed viewing of all internal surfaces of said channeling means in the absence of said ball and said ball retaining means.

6. The ball-check valve of claim 5 wherein the internal surfaces of said retaining means, said channeling means, and said constricting means are polished sufficiently to avoid bacterial build-up.

7. A method for inspecting both the inlet and outlet sides of a ball-check valve of a sanitary pump clamped into a vertical section of piping to determine whether the housing is free of entrapped food matter that can cause bacteria buildup on internal surfaces without removal of the valve from the inlet piping, comprising the steps of:

(a) providing a ball-check valve with a one-piece housing having an integral valve seat and a removable ball stop at the outlet end thereof, said housing being selectively configured to allow unobstructed viewing of all its internal surfaces from the outlet end looking upstream, (b) unclamping the valve outlet end of the one-piece housing from the piping, (c) laterally displacing the unclamped piping to provide visual access to the outlet end of the one-piece valve housing, (d) removing the ball stop from the valve outlet end of the one-piece housing, (e) removing the ball from the one-piece housing, and (f) visually inspecting the ball, the ball-stop and all internal surfaces of the housing without removal of the valve housing from the piping on the inlet side thereof.

* * * * *